United States Patent
Qiu et al.

(10) Patent No.: US 8,290,128 B2
(45) Date of Patent: Oct. 16, 2012

(54) UNIFIED COMMUNICATION BASED MULTI-SCREEN VIDEO SYSTEM

(75) Inventors: Jingyu Qiu, Seattle, WA (US); Warren Vincent Barkley, Bellevue, WA (US); Timothy M. Moore, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 308 days.

(21) Appl. No.: 12/813,083

(22) Filed: Jun. 10, 2010

(65) Prior Publication Data

US 2011/0304686 A1 Dec. 15, 2011

(51) Int. Cl.
*H04M 11/00* (2006.01)

(52) U.S. Cl. ............... 379/93.21; 379/158; 379/202.01; 348/14.09

(58) Field of Classification Search ............... 348/14.01, 348/14.03, 14.07, 14.08, 14.09; 379/93.21, 379/158, 202.01, 205.01
See application file for complete search history.

(56) References Cited

U.S. PATENT DOCUMENTS

| | | | |
|---|---|---|---|
| 7,057,637 B2 * | 6/2006 | White | 348/14.16 |
| 7,154,526 B2 * | 12/2006 | Foote et al. | 348/14.08 |
| 2005/0052835 A1 | 3/2005 | Wu et al. | |
| 2007/0273755 A1 | 11/2007 | Yang et al. | |
| 2007/0294263 A1 | 12/2007 | Punj et al. | |
| 2008/0244019 A1 | 10/2008 | Mellor et al. | |
| 2009/0147771 A1 | 6/2009 | Seal et al. | |
| 2009/0327419 A1 | 12/2009 | Serr et al. | |
| 2010/0073454 A1 | 3/2010 | Lovhaugen et al. | |
| 2010/0080214 A1 | 4/2010 | Li et al. | |
| 2010/0228825 A1 * | 9/2010 | Hegde et al. | 709/204 |
| 2011/0173263 A1 * | 7/2011 | Beers et al. | 709/204 |
| 2011/0283008 A1 * | 11/2011 | Smelyansky | 709/231 |

OTHER PUBLICATIONS

"Video Conferencing, the Enterprise and You", Retrieved at <<http://blog.radvision.com/images/eBook/Video-Conferencing-eBook.pdf>>, Dec. 2008, pp. 39.

Pritam, Nilesh., "Tandberg First to Demonstrate Immersive Three-Screen Telepresence Interoperability with Cisco TelePresence", Retrieved at <<http://asianetnews.net/view-release?pr-id=38093>>, Feb. 2, 2010, pp. 2.

"Samsung 2263DX with Tandem 7-Inch Monitor", Retrieved at <<http://www.gadgetcrunch.net/2008/01/06/samsung-2263dx-with-tandem-7-inch-monitor/>>, Jan. 6, 2008, pp. 4.

"Polycom Expands Video Integration For Microsoft Unified Communications Environments", Retrieved at <<http://unified.cbronline.com/news/polycom_expands_video_integration_for_microsoft_unified_communications_environments_100209>>, Feb. 9, 2010, pp. 2.

"International Search Report", Mailed Date: Jan. 13, 2012, Application No. PCT/US2011/037219, Filed Date: May 19, 2011, pp. 8. (MS# 329547.02).

* cited by examiner

*Primary Examiner* — Olisa Anwah
(74) *Attorney, Agent, or Firm* — Turk IP Law, LLC

(57) ABSTRACT

A multiple screen telepresence style video conferencing experience is provided employing generic hardware and intelligent software, which may be based on existing enhanced communication systems such as unified communication systems. Through a component based approach, the system can be deployed in any conference room, assembled on the spot by an untrained user, flexible to accommodate any number of screens.

20 Claims, 10 Drawing Sheets

UNIFIED COMMUNICATION BASED MULTI-SCREEN VIDEO SYSTEM

BACKGROUND

As an alternative to Public Switched Telephone Network (PSTN) systems, cellular phone networks have proliferated over the last decades, where users with cellular phones have access to one or more networks at almost any location. Also a recent development is the wide spread use of Voice over IP (VOIP) telephony, which uses internet protocol (IP) over wired and wireless networks. With the availability of such diverse types of communication networks and devices capable of taking advantage of various features of these networks, enhanced communication systems bring different communication networks together providing until now unavailable functionality such as combining various modes of communication (e.g. instant messaging, voice calls, video communications, etc.). This technology is also referred to as unified communications (UC). A network of servers manages end devices capable of handling a wide range of functionality and communication while facilitating communications between the more modern unified communication network devices and other networks (e.g. PSTN, cellular, etc.).

One of the popular features of enhanced communication systems is video conferencing, which participants may attend through their desktop computing devices. Regular video conferencing has its limitations and is a developing technology. Telepresence systems showcase the state of a art video conferencing experience providing an immersive experience such that meeting participants feel they are sitting face to face with each other and can effortlessly communicate with each other. Telepresence delivers the promise of video conferencing as something that can replace travel. However, telepresence is also an expensive undertaking with high system and maintenance costs making it limited to executive use and not reachable for the masses. Telepresence deployment may be quite involved requiring month of planning, building out the space, and installing special hardware and furniture.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a multiple screen telepresence style video conferencing experience employing generic hardware and intelligent software, which may be based on existing enhanced communication systems such as unified communication systems. Through a component based approach, a system according to embodiments may be deployed in any conference room, assembled on the spot by an untrained user, flexible to accommodate any number of screens.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
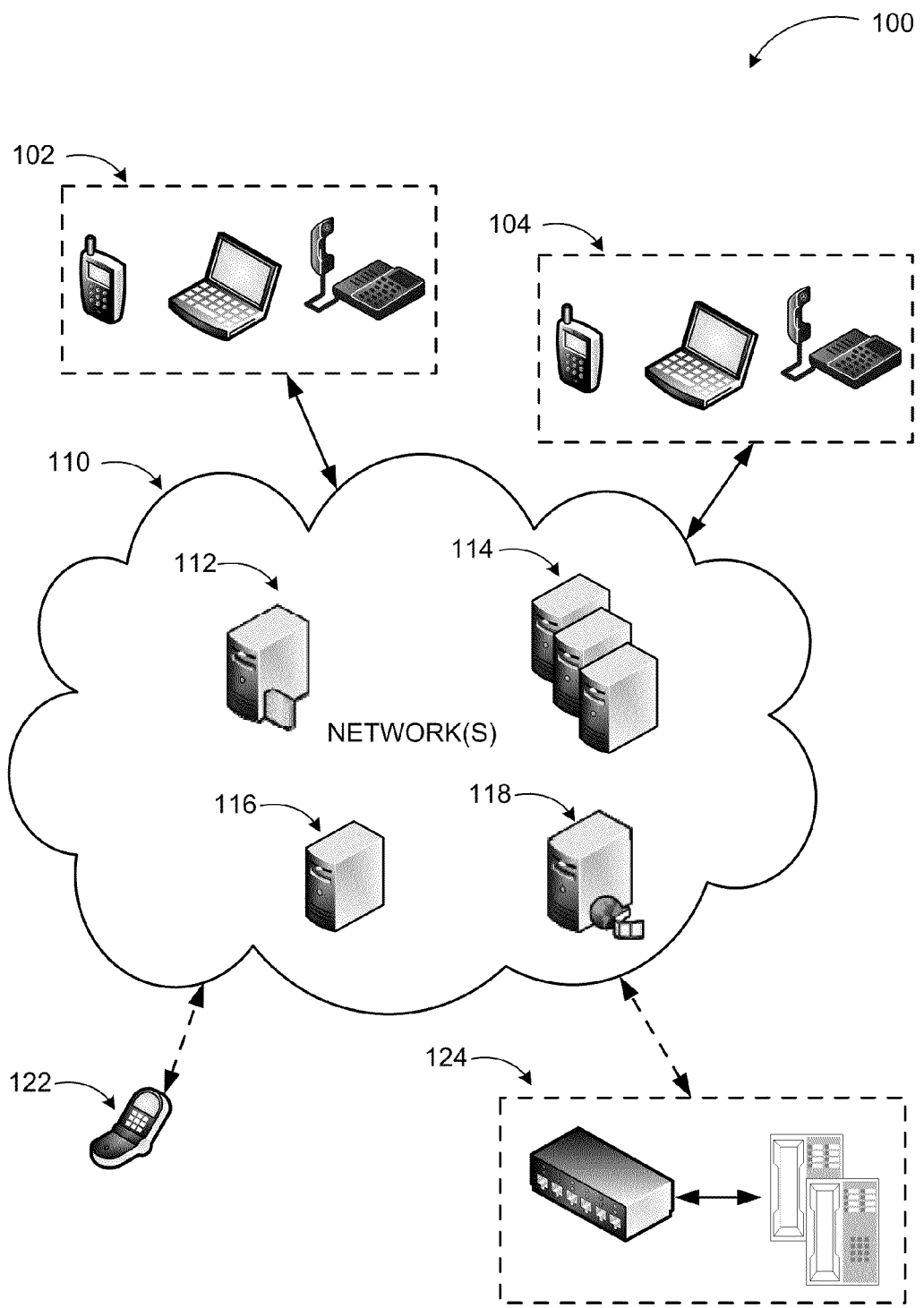
FIG. 1 is a diagram illustrating an example unified communications system, where embodiments may be implemented for providing multi-screen video conferencing.

As briefly described above, a multiple screen telepresence style video conferencing experience may be provided employing generic hardware and intelligent software based on existing enhanced communication systems such as unified communication systems. Through a component based approach, multi-screen applications may discover each other with one serving as master, the others as slaves. The system may be set up in systems with dedicated multi-point control unit (MCU), generic audio/video MCUs, or in a point to point mesh. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing multimodal communication systems. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes diagram 100 illustrating an example unified communications system, where embodiments may be implemented for providing multi-screen video conferencing. A unified communication system is an example of modern communication systems with a wide range of capabilities and services that can be provided to subscribers. A unified communication system is a real-time communications system facilitating instant messaging, presence, audio-video conferencing, web conferencing, and similar functionalities.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality.

UC Network(s) 110 includes a number of servers performing different tasks. For example, UC servers 114 provide registration, presence, and routing functionalities. Routing functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method.

SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

A UC system may provide a platform for multimodal communications including video conferencing. In a system according to embodiments, an application layer may be established over the communication application for supporting auto-discovery, handling telepresence layer logic, performing system management tasks, managing a user interface, and comparable operations. Such a system may provide single or multi-screen video conferencing through a distributed architecture between client applications or managed by a server/specialized device (e.g. an MCU) providing a telepresence experience without the complicated and burdensome infrastructure of such a system.

While the example system in FIG. 1 has been described with specific components such as mediation server, A/V server, home server, presence server, and similar devices, embodiments are not limited to these components or system configurations and can be implemented with other system configuration employing fewer or additional components. Functionality of systems managing multi-screen video conferencing through a UC infrastructure may also be distributed among the components of the systems differently depending on component capabilities and system configurations. Furthermore, embodiments are not limited to unified communication systems. The approaches discussed here may be applied to any video capable networked communication environment using the principles described herein.

Figure 2:
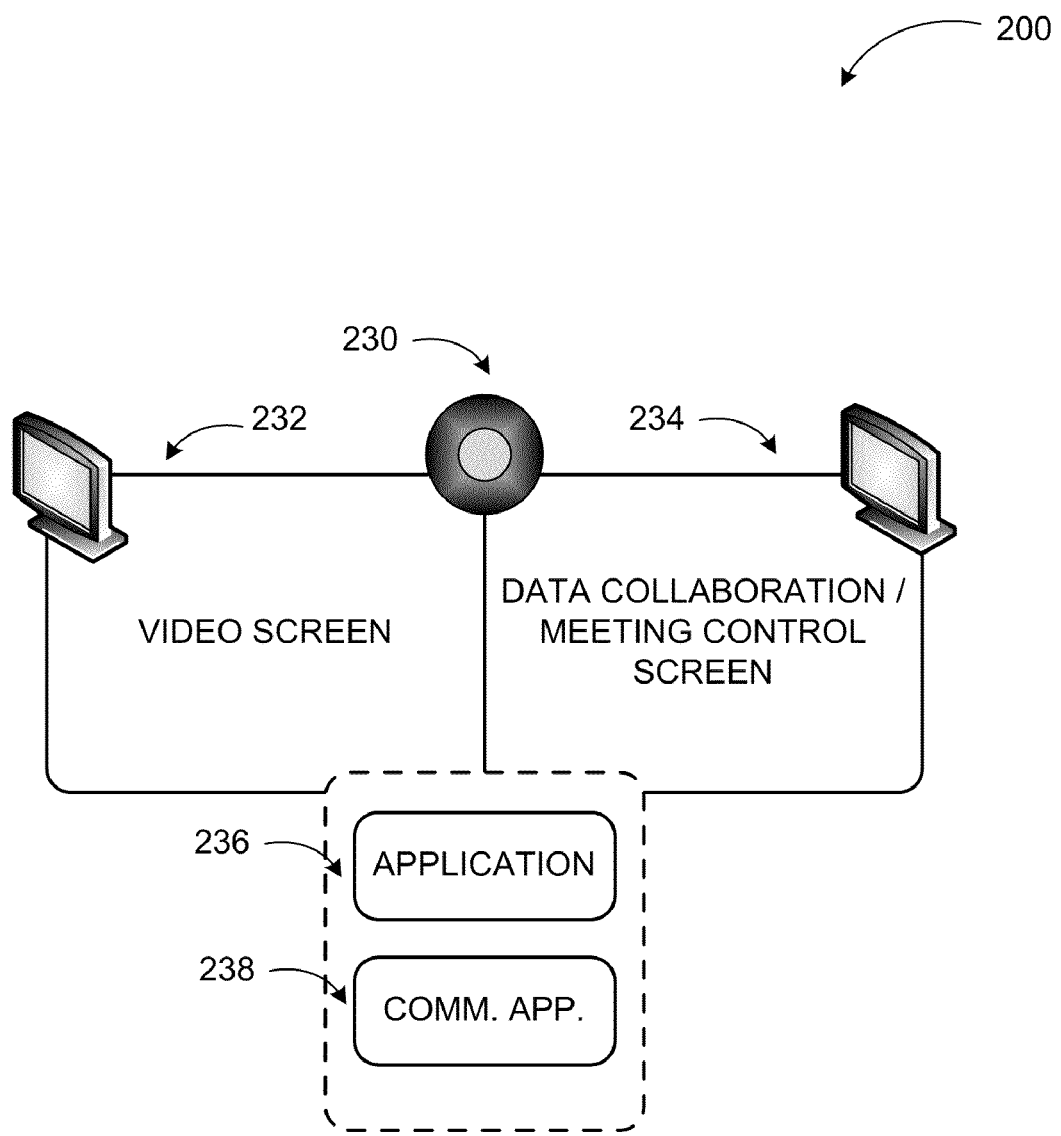
FIG. 2 is a conceptual diagram illustrating an example base unit of a multi-screen video system according to embodiments.

FIG. 2 is a conceptual diagram illustrating an example base unit of a multi-screen video system according to embodiments. As discussed previously, telepresence may be an expensive undertaking with a complicated deployment requiring prolonged planning, special hardware and furniture. A system according to embodiments may provide telepresence experience through a unified communication system at dramatically less cost, ease of installation, and deployment without special space or furniture requirements.

A system according to embodiments may provide a telepresence style video conferencing experience employing a componentized architecture within a unified communication infrastructure with generic computing device serving as base unit, as shown in diagram 200. The base unit may include generic computing device hardware such as a display, a processor, a camera 230, audio input and output devices (microphone, speakers), and comparable ones. The display may be a high resolution display capable of handling high definition (HD) video. The processor may need to be capable of processing multiple video streams. Thus, the processor may be a multi-core processor. The camera 230 may also need to be an HD capable camera for high quality video imaging.

The base unit computing device may execute a UC communication application 238 capable of facilitating multimodal communications with other clients of the system as well as providing ancillary services such as interaction with scheduling applications, contact list management, presence-based services, and comparable ones. UC communication application 238 may support SIP and other protocols for media transport as discussed previously. The base unit computing device may further execute a multi-screen application 236 adapted to support auto-discovery (for discovering and connecting to other multi-screen applications in a conference mode), telepresence logic, system management, and user interface for the multi-screen video conferencing operations.

In an operation mode, the display of the base unit computing device may present a video screen 232 for communication with another participant and a data collaboration/meeting control screen 234 for application sharing, system control, and similar purposes. The data collaboration/meeting control screen 234 is the main user interface of the multi-screen application enabling users to select conferencing modes, set operational parameters, and perform comparable tasks.

Figure 3:
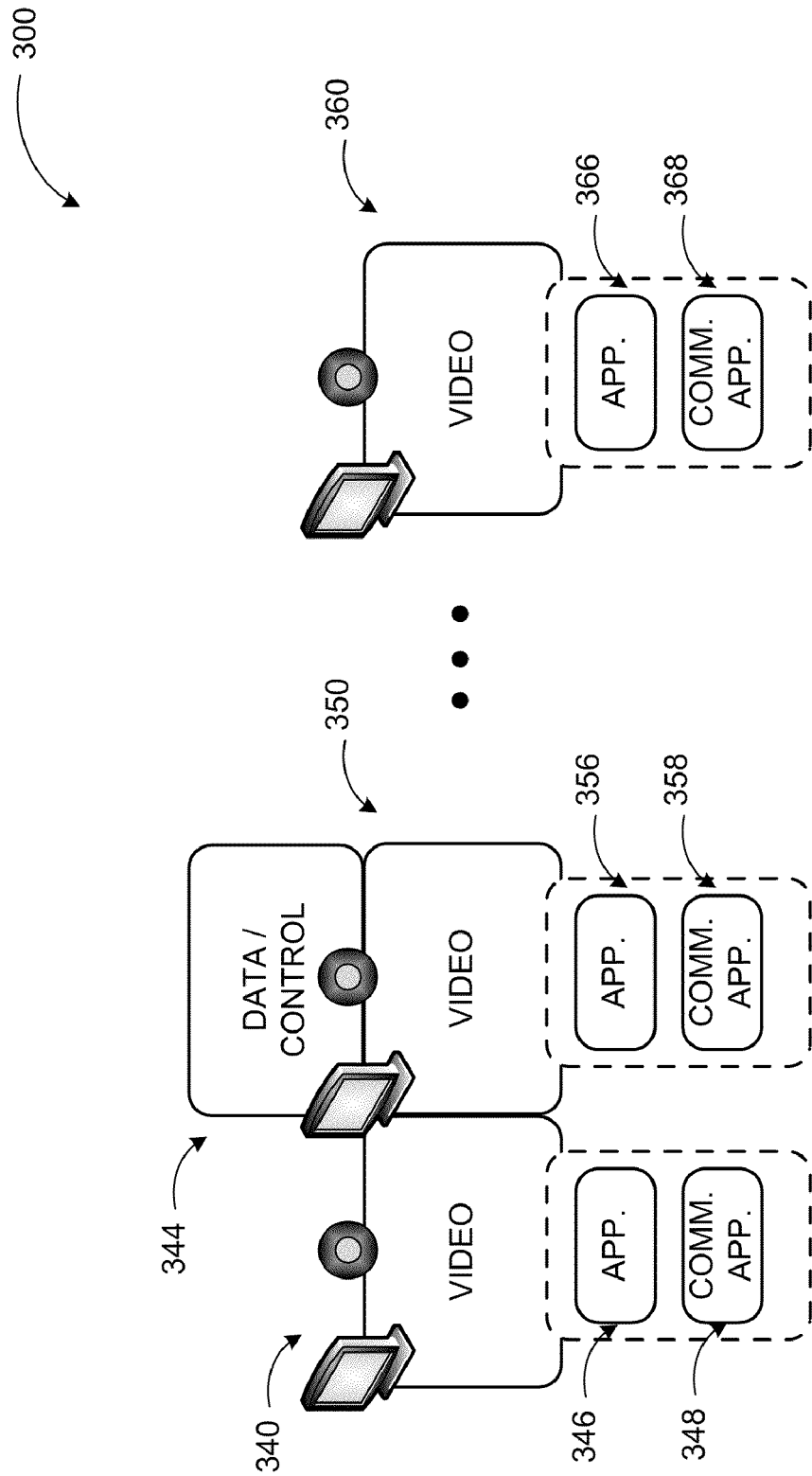
FIG. 3 is a conceptual diagram illustrating an example cascading model for a multi-screen video system according to embodiments.

FIG. 3 includes conceptual diagram 300 illustrating an example cascading model for a multi-screen video system according to embodiments. When N single screen clients 340, 350, and 360 are set up together, the multi-screen applications 346, 356, and 366 may discover each other through manual setup or programmatic discovery via location aware Application Programming Interfaces (APIs). An administrator may elect client (e.g. 350) as the master, the rest may serve as slaves.

The master client 350 may include the data collaboration/control screen 344. The clients may communicate with each other and other components of the system through communication applications 348, 358, and 368. In a peer-to-peer call, the master client may set up the initial call then drive the slave clients to connect to the remote side. In a multi-party call, the master client may set up multiple conferences through an MCU and use the UC system's MCU capability (e.g. switching, multi-view, etc.) to construct the telepresence topology. According to other embodiments, clients may self-organize among themselves without involving additional MCUs or infrastructure servers.

Figure 4:
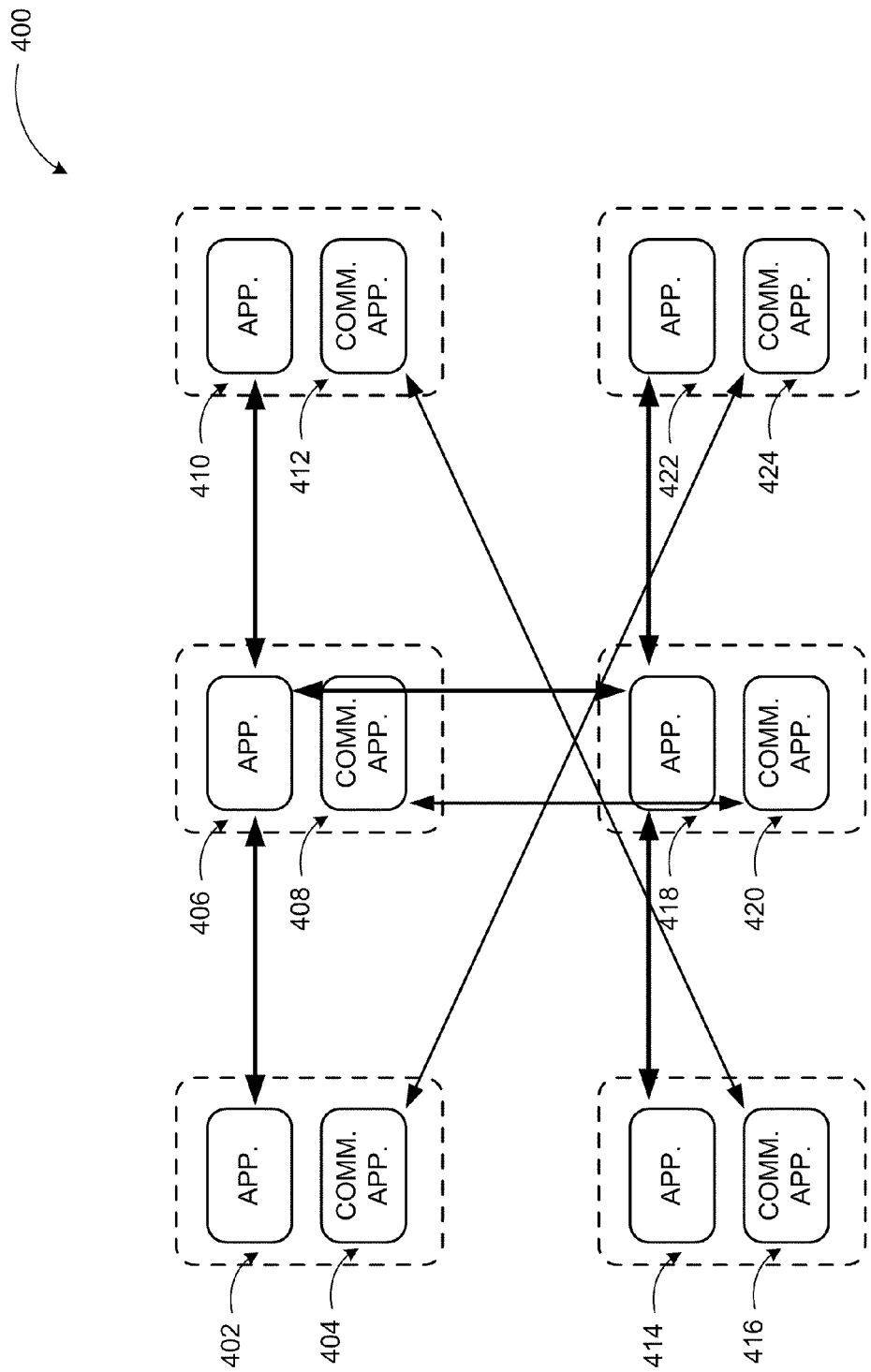
FIG. 4 is a conceptual diagram illustrating an example architecture of a multi-screen video system according to embodiments.

FIG. 4 includes conceptual diagram 400 illustrating one example architecture of a multi-screen video system according to embodiments. In an example system, the flow may begin with multi-screen applications (402, 406, 410, 414, 418, and 422) discovering each other and election of a master (e.g. 418). The communication applications (404, 408, 412, 416, 420, and 424) may register themselves and identify the clients as rooms (for video conferencing). The master unit may be registered as room X.

When room Y calls room X for multi-screen video conferencing, the call may be marked as a telepresence call. Room X multi-screen application (e.g. 418) may accept the call and negotiate topology. The application layer may drive the communication application to make the proper peer-to-peer call. The application layer may also drive the communication application for the master unit to establish data collaboration. Next, the communication application may establish the audio/video call and further establish an application channel with the UC system Application Sharing MCU (ASMCU).

If telepresence topology involves a telepresence server, the flow may still be similar with the multi-screen application deciding the proper SIP endpoint to call. Interoperability among telepresence systems is based on the negotiation of telepresence topology between two different systems.

Figure 5:
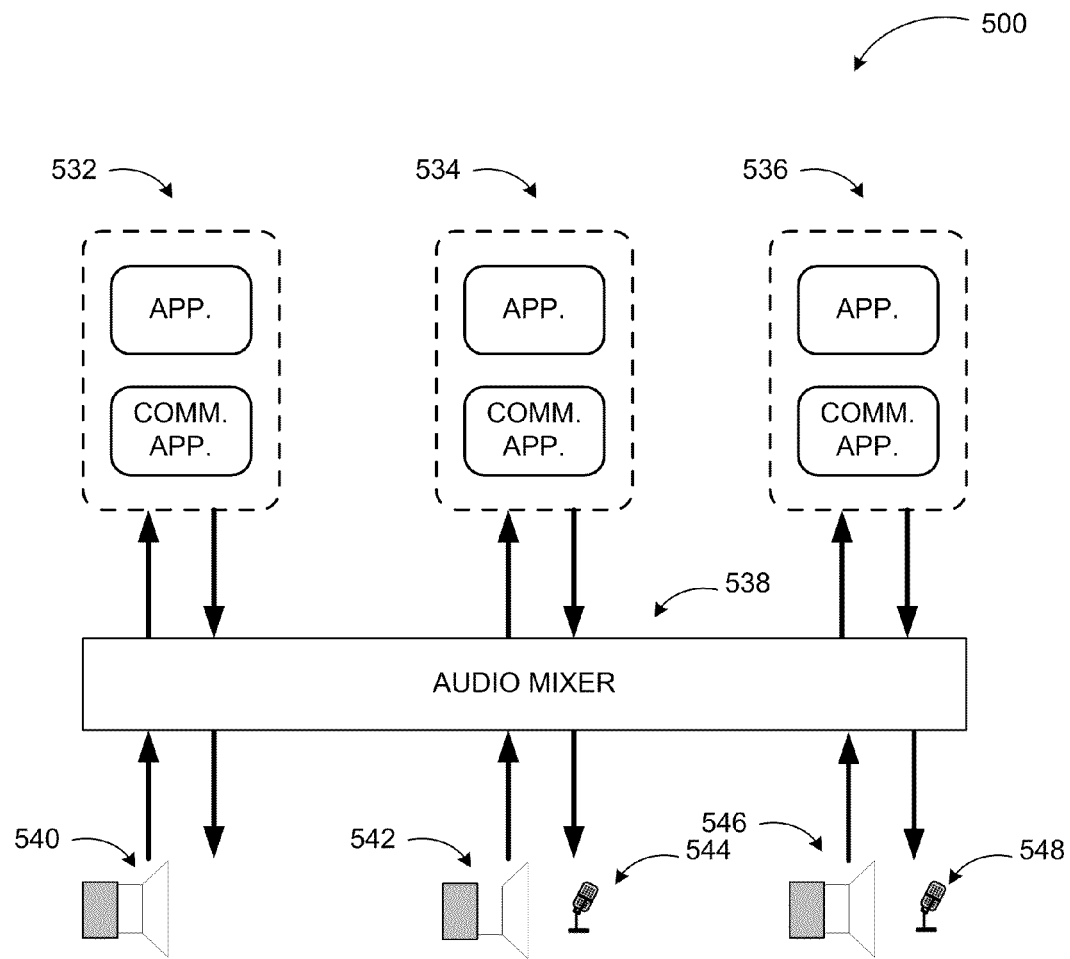
FIG. 5 is a conceptual diagram illustrating spatial audio handling in a multi-screen video system.

FIG. 5 includes conceptual diagram 500 illustrating spatial audio handling in a multi-screen video system. In a telepresence style multi-screen video system, audio coming from each unit 532, 534, 536 forms spatial audio. An audio mixer 538 may be employed to create a realistic presentation of the spatial audio through speakers 540, 542, 546, and capture of audio through microphones 544, 548. Echo may be a unique challenge in a system according to embodiments. An external audio mixer may be employed to perform local and/or distributed echo cancellation if integrated audio mixers are inadequate. According to some embodiments, an intelligent camera may be employed with pan, tilt, zoom, and exposure control capabilities to achieve optimal experience even under non-ideal lighting conditions.

A system according to embodiment enables establishment of a multi-screen telepresence framework out of single screen video systems. In addition to the single platform configuration for various communication modes, the system is extensible to N units by simply adding another unit with a communication application/multi-screen application structure lowering cost and complexity of the telepresence experience.

Figure 6:
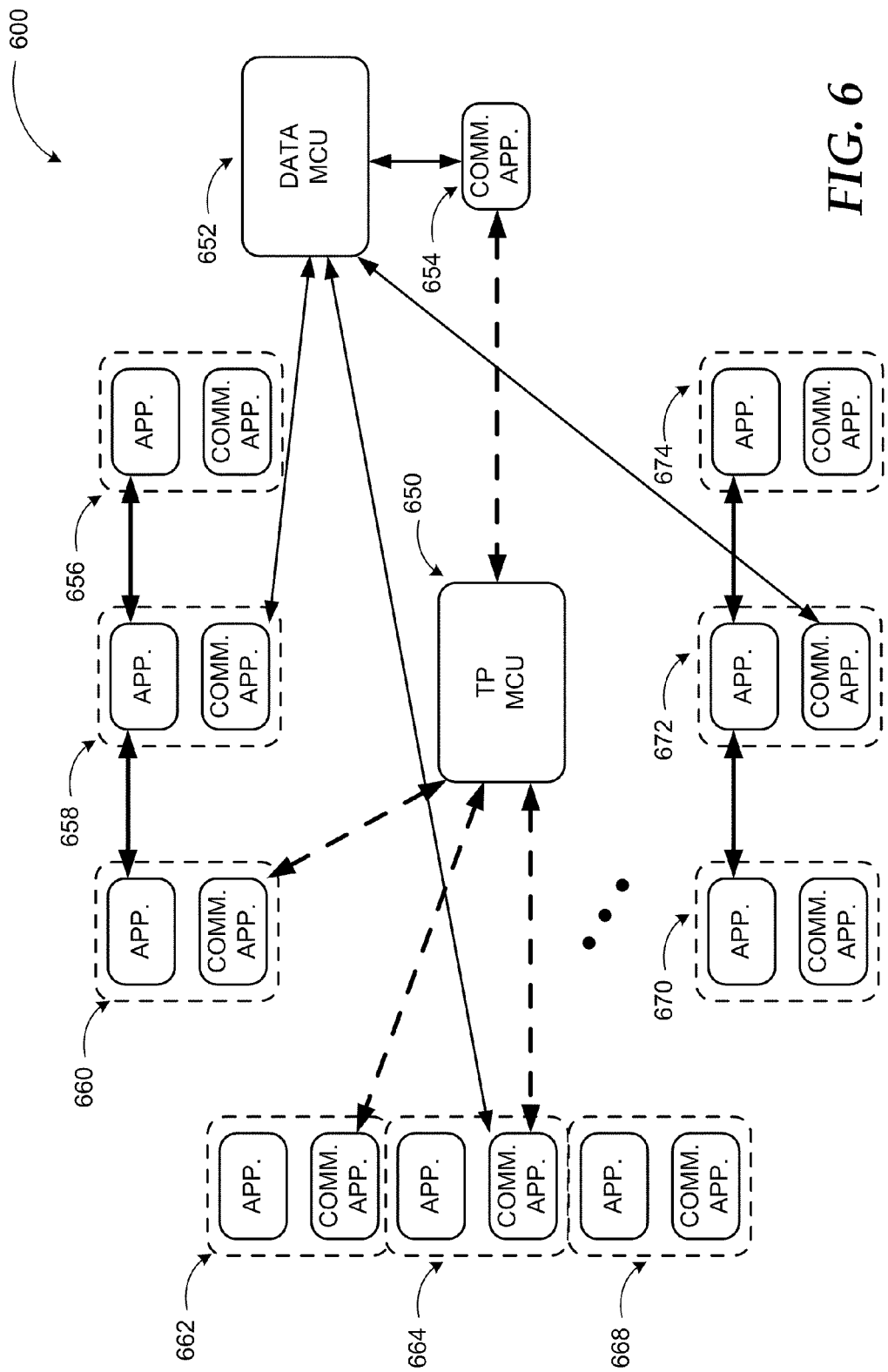
FIG. 6 is a conceptual diagram illustrating an example multi-screen video system with a telepresence multi-point control unit (MCU)

FIG. 6 includes conceptual diagram 600 illustrating an example multi-screen video system with a telepresence multi-point control unit (MCU). As discussed previously, the master client (e.g. 672) may set up the initial call, and then drive the slave clients to connect to the remote side in a peer-to-peer call. In a multi-party call, the master client may set up multiple conferences through a telepresence MCU 650 and use the UC system's data MCU 652 to construct the telepresence topology.

Alternatively, the telepresence MCU 650 discover the multi-screen applications and set up the multi-screen video conference communicating with each participating unit (656, 658, 660, 662, 664, 668, 670, 672, and 674) for establishment of communication channels and other modalities of communication such as data sharing. Communication application 654 may facilitate communication between data MCU 652 and telepresence MCU 650. Multi-screen applications of each of the units may perform the tasks described previously for providing a telepresence experience in video conferencing.

Figure 7:
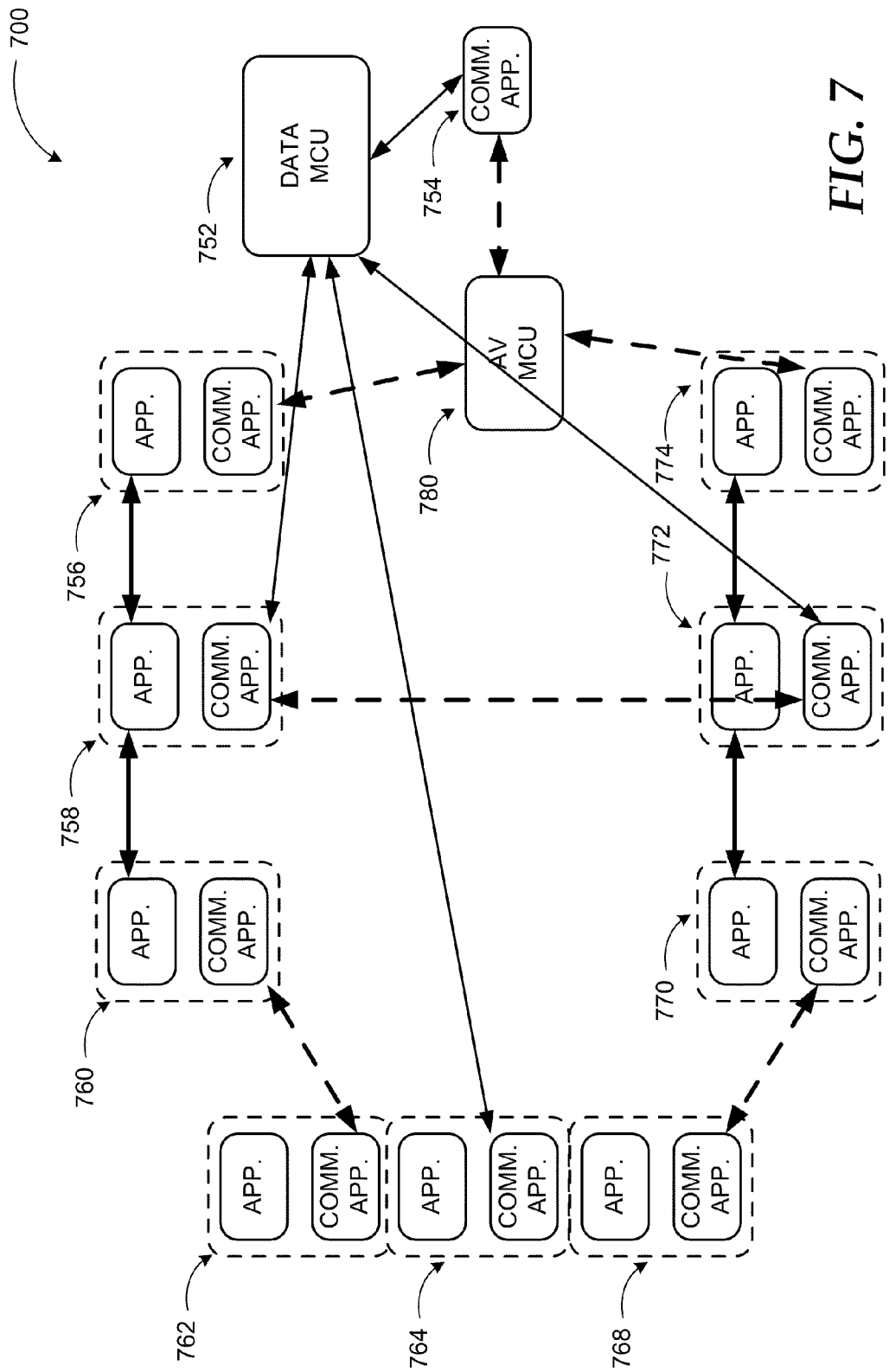
FIG. 7 is a conceptual diagram illustrating an example mesh multi-screen video system according to embodiments.

FIG. 7 is a conceptual diagram illustrating an example mesh multi-screen video system according to embodiments. Diagram 700 includes units 756, 758, 760, 762, 764, 768, 770, 772, and 774 in a mesh configuration without a telepresence MCU. In this configuration, the multi-screen applications may discover each other and a master unit may be selected for managing the conference. Audio/video MCU 780 may be used to interoperate with desktop UC clients (or any other VTC, phones, or mobile devices) and data MCU 752 of the UC system may be used to facilitate multi-party data collaboration. Communication application 754 may facilitate communications with the MCUs. Other communication applications on the respective units may facilitate the underlying communication framework via SIP.

The example systems in FIG. 2 through 7 have been described with specific components such as telepresence MCUs, data MCUs, and similar ones, and particular configurations. Embodiments are not limited to communication systems according to these example configurations. An enhanced communication system employing multi-screen video conferencing with telepresence capabilities according to embodiments may be implemented in configurations employing fewer or additional components and performing other tasks.

Figure 8:
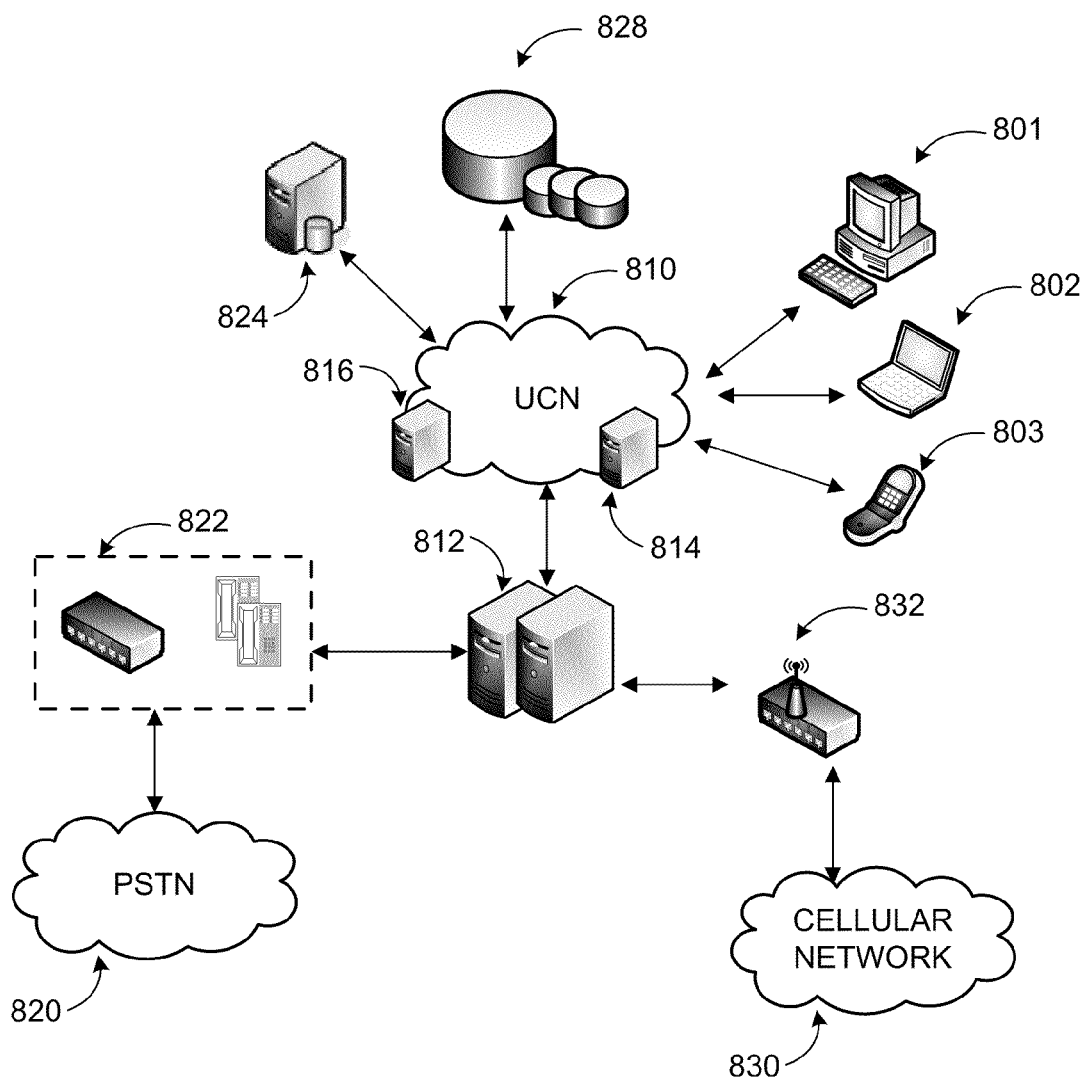
FIG. 8 is a networked environment, where a system according to embodiments may be implemented.

FIG. 8 is an example networked environment, where embodiments may be implemented. A UC based multi-screen video system as described previously may be implemented in a distributed manner over a number of physical and virtual clients and servers. Such a system may typically involve one or more networks such as PSTN 820, cellular network 830, and UCN 810. At least one of the systems may be implemented in un-clustered systems or clustered systems employing a number of nodes communicating over one or more networks.

A system according to embodiments may comprise any topology of servers, clients, Internet service providers, and communication media. Also, the system may have a static or dynamic topology. The term "client" may refer to a client application or a client device. A system according to embodiments may involve many more components, typical and relevant ones are discussed in conjunction with this figure.

Mediation server(s) 812 may provide signaling and media exchange between the different systems. A PBX 822 and an RF modem 832 may be used for connection between the PSTN and the cellular networks, respectively, and the mediation server(s) 812. Client devices 801, 802, 803 communicate with each other and with devices on other networks through UCN 810. The UC system may include a one or more specialized or combination servers for presence, routing, and other functionalities as discussed in more detail above.

While audio and text based communications may be facilitated over the PSTN and cellular networks (as well as the UC network itself), video capable clients of the UC network may be enabled to facilitate multi-screen video conferencing in a telepresence style employing a multi-screen application. The architecture may be mesh architecture and/or managed by one or more central telepresence MCUs as discussed above.

Client devices 801-803 and the servers of the system may communicate through SIP in routing requests and other protocols in transferring media. Data associated with the system and other network related operations may be stored in one or more data stores such as data stores 828, which may be directly accessed by the servers and/or clients of the system or managed through a database server 824. UCN 810 provides the backbone of the UC system and may employ a number of protocols such as SIP, RTP, and the like. Client devices (e.g. 801-803) provide platforms for UCN user end points. Users may access the communication system using a client device or one or more client applications running on a client device.

UCN 810 provides communication between the nodes described herein. By way of example, and not limitation, UCN 810 may include wired media such as a wired network or direct-wired connection, and wireless media such as acoustic, RF, infrared and other wireless media.

Many other configurations of computing devices, applications, data sources, data distribution systems may be employed to implement multi-screen video conferencing. Furthermore, the networked environments discussed in FIG. 8 are for illustration purposes only. Embodiments are not limited to the example applications, modules, or processes.

Figure 9:
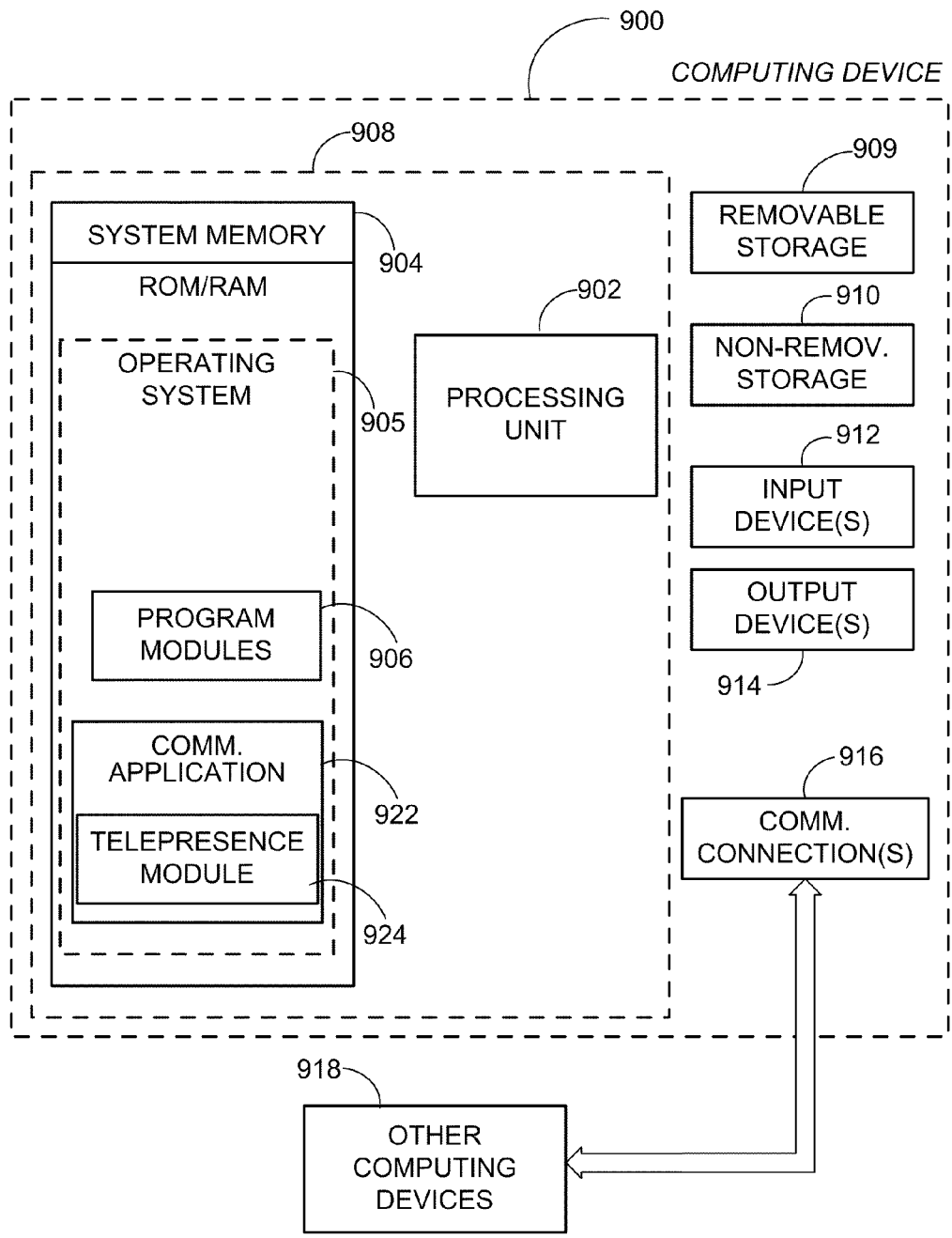
FIG. 9 is a block diagram of an example computing operating environment, where embodiments may be implemented.

FIG. 9 and the associated discussion are intended to provide a brief, general description of a suitable computing environment in which embodiments may be implemented. With reference to FIG. 9, a block diagram of an example computing operating environment for an application according to embodiments is illustrated, such as computing device 900. In a basic configuration, computing device 900 may be a computing device executing a communication application as part of an enhanced communication system and include at least one processing unit 902 and system memory 904. Computing device 900 may also include a plurality of processing units that cooperate in executing programs. Depending on the exact configuration and type of computing device, the system memory 904 may be volatile (such as RAM), non-volatile (such as ROM, flash memory, etc.) or some combination of the two. System memory 904 typically includes an operating system 905 suitable for controlling the operation of the platform, such as the WINDOWS® operating systems from MICROSOFT CORPORATION of Redmond, Wash. The system memory 904 may also include one or more software applications such as program modules 906, communication application 922 and multi-screen application 924.

Communication application 922 may be any application that facilitates multimodal communication between other client devices of the enhanced communication system and computing device 900. Multi-screen application 924 may manage multi-screen video conference user interface, meeting logic, and auxiliary devices such as camera, microphones, speakers, etc. as discussed previously. This basic configuration is illustrated in FIG. 9 by those components within dashed line 908.

Computing device 900 may have additional features or functionality. For example, the computing device 900 may also include additional data storage devices (removable and/or non-removable) such as, for example, magnetic disks, optical disks, or tape. Such additional storage is illustrated in FIG. 9 by removable storage 909 and non-removable storage 910. Computer readable storage media may include volatile and nonvolatile, removable and non-removable media implemented in any method or technology for storage of information, such as computer readable instructions, data structures, program modules, or other data. System memory 904, removable storage 909 and non-removable storage 910 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 900. Any such computer readable storage media may be part of computing device 900. Computing device 900 may also have input device(s) 912 such as keyboard, mouse, pen, voice input device, touch input device, and comparable input devices. Output device(s) 914 such as a display, speakers, printer, and other types of output devices may also be included. These devices are well known in the art and need not be discussed at length here.

Computing device 900 may also contain communication connections 916 that allow the device to communicate with other devices 918, such as over a wired or wireless network in a distributed computing environment, a satellite link, a cellular link, a short range network, and comparable mechanisms. Other devices 918 may include computer device(s) that execute communication applications, presence servers, and comparable devices. Communication connection(s) 916 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 10:
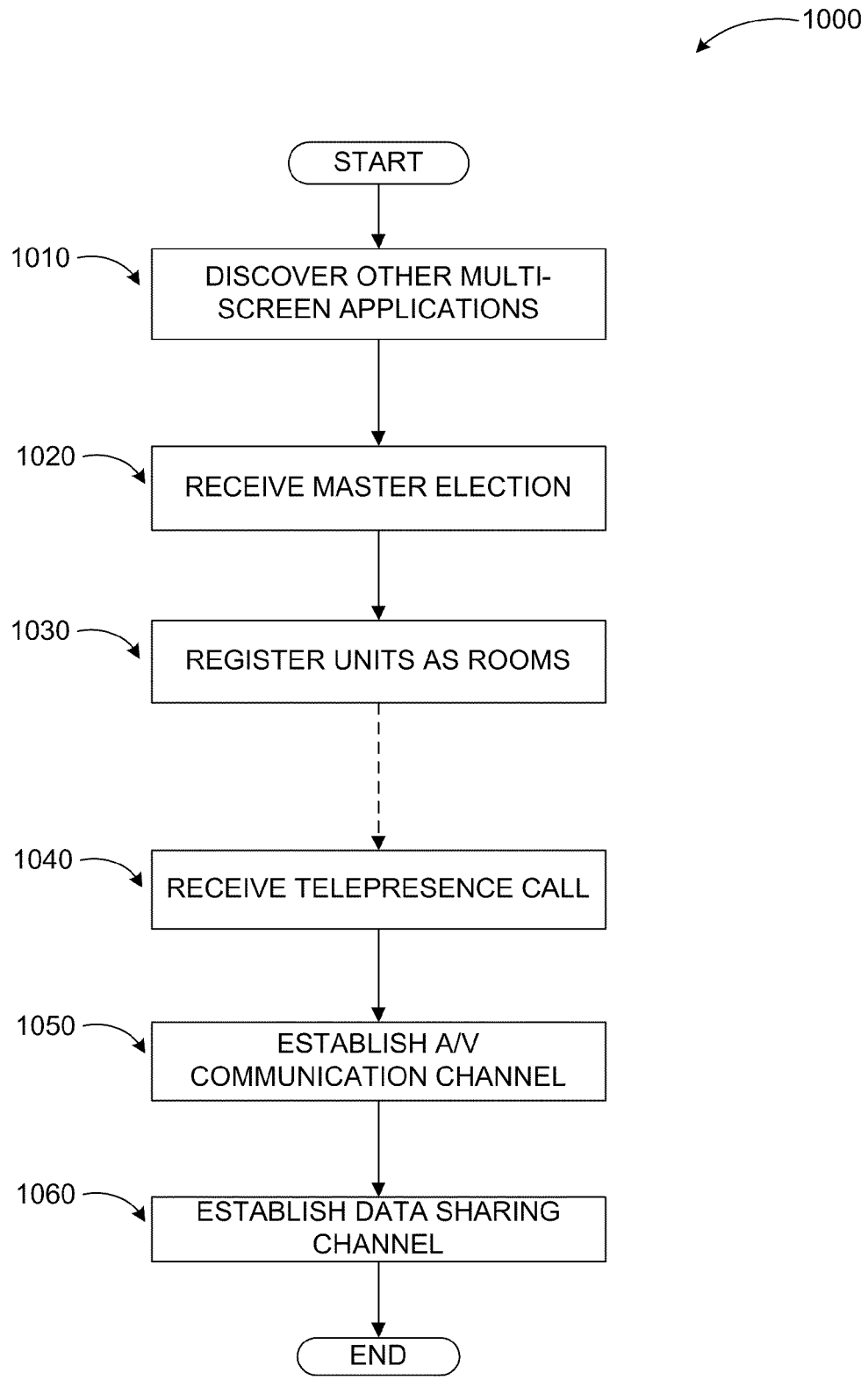
FIG. 10 illustrates a logic flow diagram for a process of managing a multi-screen video system according to embodiments.

FIG. 10 illustrates a logic flow diagram for process 1000 of managing a multi-screen video system according to embodiments. Process 1000 may be implemented as part of an enhanced communication system.

Process 1000 begins with operation 1010, where multi-screen applications on UC client devices perform auto-discovery finding each other. This may be followed by election of a master at operation 1020. A communication application component on each unit (client device) may register the units as rooms (for the purpose of multi-screen video conferencing) at operation 1030 indicating the master unit in the registration process.

Upon receiving a call from another client device in the system at operation 1040, the multi-screen application of the master unit may accept the call, negotiate a topology for the call, and enable the communication application component to establish the audio/video communication channel at operation 1050. Realistic video conference experience through manipulation of video and audio signals (e.g. spatial audio, high quality video, cascading of the video displays, etc.) may be managed by the multi-screen application. If a data sharing session such as application sharing or whiteboard sharing are part of the conference, a data sharing channel may be established by the communication application component(s) at operation 1060.

The operations included in process 1000 are for illustration purposes. Multi-screen video conferencing using a unified communication infrastructure according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for providing telepresence multi-screen video conferencing, the method comprising:
    discovering multi-screen applications executed on clients in an enhanced communication system;
    receiving a master client election;
    registering clients of discovered multi-screen applications through communication applications executed on the clients;
    in response to receiving a telepresence call, establishing an audio/video communication channel through the communication application; and
    if the call includes data sharing, establishing a data sharing channel through the communication application.

2. The method of claim 1, further comprising:
    displaying a video screen for communicating with another participant and a data screen for at least one of application sharing and system control.

3. The method of claim 1, further comprising:
    discovering other multi-screen applications through one of: manual setup and programmatic discovery via topology aware Application Programming Interfaces (APIs).

4. The method of claim 1, wherein the multi-screen applications include telepresence logic, system management controls, and a user interface controller for multi-screen video conferencing operations.

5. The method of claim 1, wherein a client elected as master establishes an initial video conference and directs other clients to connect to the video conference.

6. The method of claim 1, wherein the client elected as master establishes one or more multi-screen video conferences through a telepresence Multipoint Control Unit (MCU) and employs a data MCU of the enhanced communication system to construct telepresence topology.

7. The method of claim 6, wherein interoperation between two or more systems is accomplished through negotiating telepresence topology of the systems.

8. The method of claim 1, further comprising:
    employing an internal audio mixer to generate spatial audio output based on audio input from participating clients.

9. The method of claim 1, further comprising:
    employing an external audio mixer to mitigate at least one of local and distributed echo.

10. The method of claim 1, further comprising:
    employing an intelligent cameras with at least one from a set of: pan, tilt, zoom, and exposure control capabilities to enhance video quality in each unit.

11. The method of claim 1, further comprising:
    expanding the multi-screen video system by adding a computing device with a camera, an audio input device, an audio output device, a communication application, and a multi-screen application as client to the enhanced communication system.

12. A computing device capable of providing telepresence multi-screen video conferencing within an enhanced communication system, the computing device comprising:
    a camera;
    an audio input device;
    an audio output device;
    a memory; and
    a processor executing a multi-screen application and a multimodal communication application, where in the processor is configured to:
        discover multi-screen applications executed on other computing devices in the enhanced communication system;
        receive a master unit election;
        register as a conference room through the communication application;
        in response to receiving a telepresence call from another computing device, establish an audio/video communication channel through the communication application;

if the call includes data sharing, establish a data sharing channel through the communication application; and display a video screen for communicating with another participant and a data screen for at least one of application sharing and system control.

13. The computing device of claim 12, wherein the processor is further configured to:
    for peer-to-peer calls set up the initial call through the multi-screen application and enable other computing devices to connect; and
    for multi-party calls set up multiple conferences through a telepresence Multipoint Control Unit (MCU) and construct a telepresence topology through a data MCU.

14. The computing system of claim 12, wherein an audio/video MCU and the data MCU of the enhanced communication system are employed to set up the conferences.

15. The computing device of claim 12, wherein the multi-screen application is adapted to provide one or more video screens for communicating with other participants and a data screen for at least one of: data sharing applications and system management controls.

16. The computing device of claim 12, wherein the camera is a high definition (HD) capable camera with at least one from a set of: pan, tilt, zoom, and exposure control capabilities.

17. The computing device of claim 12, wherein the audio input device is capable of capturing spatial audio.

18. A computer-readable storage medium with instructions stored thereon for providing telepresence multi-screen video conferencing within an enhanced communication system, the instructions comprising:
    discovering multi-screen applications executed on computing devices in the enhanced communication system;
    receiving a master unit election for one of the multi-screen applications;
    registering discovered computing devices through corresponding communication applications executed on each computing device;
    in response to receiving a telepresence call at a computing device executing the master multi-video application, establishing an audio/video communication channel through the communication application of the same computing device;
    if the call includes data sharing, establishing a data sharing channel through the communication application of the same computing device; and
    displaying a video screen for communicating with another participant and a data screen for at least one of application sharing and system control on each computing device.

19. The computer-readable medium of claim 18, wherein the instructions further comprise:
    if the enhanced communication system includes a telepresence Multipoint Control Unit (MCU), establishing a multi-party conference as a plurality of conferences through the telepresence MCU, and constructing a telepresence topology through one of more data MCUs of the enhanced communication system.

20. The computer-readable medium of claim 18, wherein communication application is configured to provide ancillary services comprising at least one from a set of: interaction with scheduling applications, contact list management, and presence-based services.

* * * * *